United States Patent
Kumata et al.

(10) Patent No.: US 9,135,592 B2
(45) Date of Patent: Sep. 15, 2015

(54) DEVICE MANAGEMENT SYSTEM

(75) Inventors: Toshiaki Kumata, Kusatsu (JP); Seiji Kawai, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 639 days.

(21) Appl. No.: 13/203,571

(22) PCT Filed: Mar. 8, 2010

(86) PCT No.: PCT/JP2010/001592
§ 371 (c)(1),
(2), (4) Date: Aug. 26, 2011

(87) PCT Pub. No.: WO2010/103779
PCT Pub. Date: Sep. 16, 2010

(65) Prior Publication Data
US 2011/0307099 A1   Dec. 15, 2011

(30) Foreign Application Priority Data
Mar. 12, 2009   (JP) ................. 2009-059640

(51) Int. Cl.
G05B 13/00   (2006.01)
*G06Q 10/06*   (2012.01)
*G06Q 50/06*   (2012.01)
F24F 11/00   (2006.01)

(52) U.S. Cl.
CPC ............. *G06Q 10/063* (2013.01); *G06Q 10/06* (2013.01); *G06Q 50/06* (2013.01); *F24F 2011/0091* (2013.01)

(58) Field of Classification Search
USPC ............................ 700/276; 717/174; 315/154
See application file for complete search history.

(56) References Cited

U.S. PATENT DOCUMENTS

| | | | |
|---|---|---|---|
| 2,492,735 A * | 12/1949 | Conard et al. | 426/615 |
| 4,336,273 A * | 6/1982 | Lee | 426/321 |
| 5,332,589 A * | 7/1994 | Hinnergardt et al. | 426/231 |
| 2002/0083430 A1 * | 6/2002 | Kusuda et al. | 717/174 |
| 2004/0065094 A1 * | 4/2004 | Ormerod et al. | 62/62 |
| 2005/0097905 A1 * | 5/2005 | Kwon et al. | 62/157 |
| 2006/0030954 A1 * | 2/2006 | Bergman et al. | 700/19 |
| 2006/0065750 A1 * | 3/2006 | Fairless | 236/46 R |
| 2006/0253205 A1 * | 11/2006 | Gardiner | 700/19 |

(Continued)

FOREIGN PATENT DOCUMENTS

JP   5-256482 A   10/1993
JP   2000-121126 A   4/2000

(Continued)

OTHER PUBLICATIONS

International Preliminary Report of corresponding PCT Application No. PCT/JP2010/001592.

(Continued)

*Primary Examiner* — Robert Fennema
*Assistant Examiner* — Anthony Whittington
(74) *Attorney, Agent, or Firm* — Global IP Counselors (57) ABSTRACT

A device management system is equipped with a storage section, a detecting component, and a calculating component and manages an installation device. The storage section stores operating rules of the installation device. The detecting component detects a violating action of the installation device running counter to the operating rules. The calculating component calculates a violating quantity that quantitatively expresses the violating action.

17 Claims, 9 Drawing Sheets

(56) References Cited

U.S. PATENT DOCUMENTS

2007/0016311 A1\* 1/2007 Bergman et al. ............ 700/19
2009/0037903 A1\* 2/2009 Asai ........................... 717/174
2009/0236910 A1\* 9/2009 Yamada et al. ............... 307/40

FOREIGN PATENT DOCUMENTS

| | | |
|---|---|---|
| JP | 2001-14026 A | 1/2001 |
| JP | 2001-349598 A | 12/2001 |
| JP | 2003-74943 A | 3/2003 |
| JP | 2004-116820 A | 4/2004 |
| JP | 2004-116972 A | 4/2004 |
| JP | 2005-127643 A | 5/2005 |
| JP | 2007-172406 A | 7/2007 |
| JP | 2008-164228 A | 7/2008 |

OTHER PUBLICATIONS

International Search Report of corresponding PCT Application No. PCT/JP2010/001592.

\* cited by examiner

DEVICE MANAGEMENT SYSTEM

CROSS-REFERENCE TO RELATED APPLICATIONS

This U.S. National stage application claims priority under 35 U.S.C. §119(a) to Japanese Patent Application No. 2009-059640, filed in Japan on Mar. 12, 2009, the entire contents of which are hereby incorporated herein by reference.

TECHNICAL FIELD

The present invention relates to a device management system that manages installation devices.

BACKGROUND ART

Conventionally, device management systems in which an installation device is managed so as to comply with operating rules that embody a management objective such as energy saving have been known (e.g., Japanese Patent Publication No. 2008-164228). In Japanese Patent Publication No. 2008-164228, the operating rules are delivered in the format of an operating schedule to the installation device.

SUMMARY

Technical Problem

Incidentally, when constructing a device management system in which the installation device invariably complies with the operating rules, sometimes the comfort level of the environment in which the installation device is installed is compromised. This is because the operating rules are not always created appropriately. Consequently, there are many cases where an actual device management system is constructed so as to allow the installation device a violating action running counter to the operating rules. For example, these are cases where a path for supplying control commands outside the operating rules to the installation device is prepared separately from a path for supplying control commands complying with the operating rules and where the installation device is allowed to preferentially execute last-out control commands.

However, in the above-described aspect, if the operating rules are neglected too much, there is the worry that the original purpose of the operating rules will not be achieved. Consequently, it becomes important for the user of the installation device (not only a general user but also including a manager) to accurately grasp, in terms of its relationship to the management objective of the operating rules, the violating action of the installation device running counter to the operating rules.

It is a problem of the present invention to make it possible to accurately grasp the impact that a violating action of an installation device running counter to operating rules has on the management objective of the installation device embodied in the operating rules.

Solution to the Problem

A device management system pertaining to a first aspect of the invention is equipped with a storage section, a detecting component, and a calculating component, and manages an installation device. The storage section stores operating rules of an installation device. The detecting component detects a violating action of the installation device running counter to the operating rules. The calculating component calculates a violating quantity that quantitatively expresses the violating action.

Here, a violating action of the installation device running counter to the operating rules is detected and quantified as a violating quantity. Consequently, the impact that the violating action of the installation device running counter to the operating rules has on the management objective (energy saving, etc.) of the installation device embodied in the operating rules can be accurately grasped.

A device management system pertaining to a second aspect of the invention is the device management system pertaining to the first aspect of the invention and is further equipped with an action command component. The action command component transmits a control command complying with the operating rules to the installation device.

Here, a control command complying with the operating rules is applied to the installation device. In other words, although a violating action is allowed as needed, the installation device in principle acts in compliance with the operating rules. Consequently, it becomes easy to realize the management objective embodied in the operating rules.

A device management system pertaining to a third aspect of the invention is the device management system pertaining to the first or second aspect of the invention, wherein an action that contributes to increased energy over the operating rules is included in the violating action.

Here, an action contributing to increased energy over the operating rules is allowed of the installation device, and that violating action is quantified as a violating quantity. Consequently, the impact that the violating action of the installation device running counter to the operating rules on the increased energy side has on energy-saving activities can be accurately grasped.

A device management system pertaining to a fourth aspect of the invention is the device management system pertaining to any of the first to third aspects of the invention, wherein the installation device is an air conditioner. An action outside a set temperature prescribed in the operating rules is included in the violating action.

Here, an action in a set temperature outside the operating rules is allowed of the air conditioner, and that action is quantified as a violating quantity. Consequently, the impact of the air conditioner acting in a set temperature outside the operating rules can be accurately grasped.

A device management system pertaining to a fifth aspect of the invention is the device management system pertaining to any of the first to fourth aspects of the invention, wherein at least one of a startup action and a stop action outside a timing prescribed in the operating rules is included in the violating action.

Here, the installation device is allowed to start up or stop, or start up and stop, counter to the operating rules, and that action is quantified as a violating quantity. Consequently, the impact of the installation device starting up or stopping, or starting up and stopping, counter to the operating rules can be accurately grasped.

A device management system pertaining to a sixth aspect of the invention is the device management system pertaining to any of the first to fifth aspects of the invention and is further equipped with a violating quantity output component that outputs the violating quantity.

Here, the violating action of the installation device is quantified as a violating quantity and is further outputted. Consequently, the user can accurately grasp the impact of the violating action of the installation device.

A device management system pertaining to a seventh aspect of the invention is the device management system pertaining to any of the first to sixth aspects of the invention and is further equipped with a processing component and a processing information output component. The processing component creates processing information in which the violating quantity has been processed. The processing information output component outputs the processing information.

Here, the violating action of the installation device is quantified as a violating quantity and is further processed and outputted. Consequently, the user can accurately grasp the impact of the violating action of the installation device.

A device management system pertaining to an eighth aspect of the invention is the device management system pertaining to any of the first to seventh aspects of the invention and is further equipped with a measuring component. The measuring component actually measures the energy consumption quantity of the installation device. The calculating component references the energy consumption quantity and calculates the violating quantity.

Here, the actual measurement value of the energy consumption quantity of the installation device is added at the time when the violating quantity is calculated. Consequently, the violating action of the installation device running counter to the operating rules is accurately quantified.

A device management system pertaining to a ninth aspect of the invention is the device management system pertaining to any of the first to eighth aspects of the invention, wherein an action that contributes to saved energy over the operating rules is included in the violating action.

Here, an action contributing to saved energy over the operating rules is allowed of the installation device, and that action is quantified as a violating quantity. Consequently, the impact that the violating action of the installation device running counter to the operating rules on the saved energy side has on energy-saving activities can be accurately grasped.

A device management system pertaining to a tenth aspect of the invention is the device management system pertaining to the seventh aspect of the invention and is further equipped with a collecting component. The collecting component collects device information relating to the installation device. The processing component references the violating quantity and the device information and creates, as the processing information, information suggesting the content of a future action of the installation device for offsetting the violating quantity.

Here, information suggesting the content of an action deemed necessary in the future in the installation device in order to offset the violating quantity is outputted. Consequently, a review of the operating rules applied to the installation device can be undertaken.

A device management system pertaining to an eleventh aspect of the invention is equipped with a plurality of storage sections, a plurality of detecting components, and a plurality of calculating components, and unifies and manages a plurality of management points. Management points comprise one or a plurality of installation devices. The plurality of storage sections store operating rules of the installation devices in relation to corresponding management points of the plurality of the management points. The plurality of detecting components detect violating actions of the installation devices running counter to the operating rules in relation to corresponding management points of the plurality of management points. The plurality of calculating components calculate violating quantities that quantitatively express the violating actions in relation to corresponding management points of the plurality of management points.

Here, in relation to each of the plurality of management points, violating actions of the installation devices running counter to the operating rules are detected and quantified as violating quantities. Consequently, the impact that the violating actions of the plurality of installation devices running counter to the operating rules have on the management objective (energy saving, etc.) of the installation devices embodied in the operating rules can be accurately grasped.

A device management system pertaining to a twelfth aspect of the invention is the device management system pertaining to the eleventh aspect of the invention and is further equipped with a plurality of collecting components and a creating component. The plurality of collecting components collect device information relating to the installation devices in relation to corresponding management points of the plurality of management points. The creating component references the violating quantities and the device information relating to the plurality of management points and creates information representing the relationship between the violating quantities and comfort levels of environments that the installation devices provide.

Here, on the basis of the violating quantities in the plurality of management points, information (a distribution chart, etc.) representing the relationship between the violating quantities and the comfort levels of the environments that the installation devices provide is created. Consequently, a review of the operating rules applied to the installation devices can be undertaken.

Advantageous Effects of the Invention

According to the present invention, a violating action of an installation device running counter to operating rules is detected and quantified as a violating quantity. Consequently, the impact that the violating action of the installation device running counter to the operating rules has on the management objective (energy saving, etc.) of the installation device embodied in the operating rules can be accurately grasped.

DESCRIPTION OF THE EMBODIMENT

A store management system 100 (device management system) pertaining to an embodiment of the present invention will be described with reference to the drawings below.

<Store Management System>

(1) Overall Configuration

Figure 1:
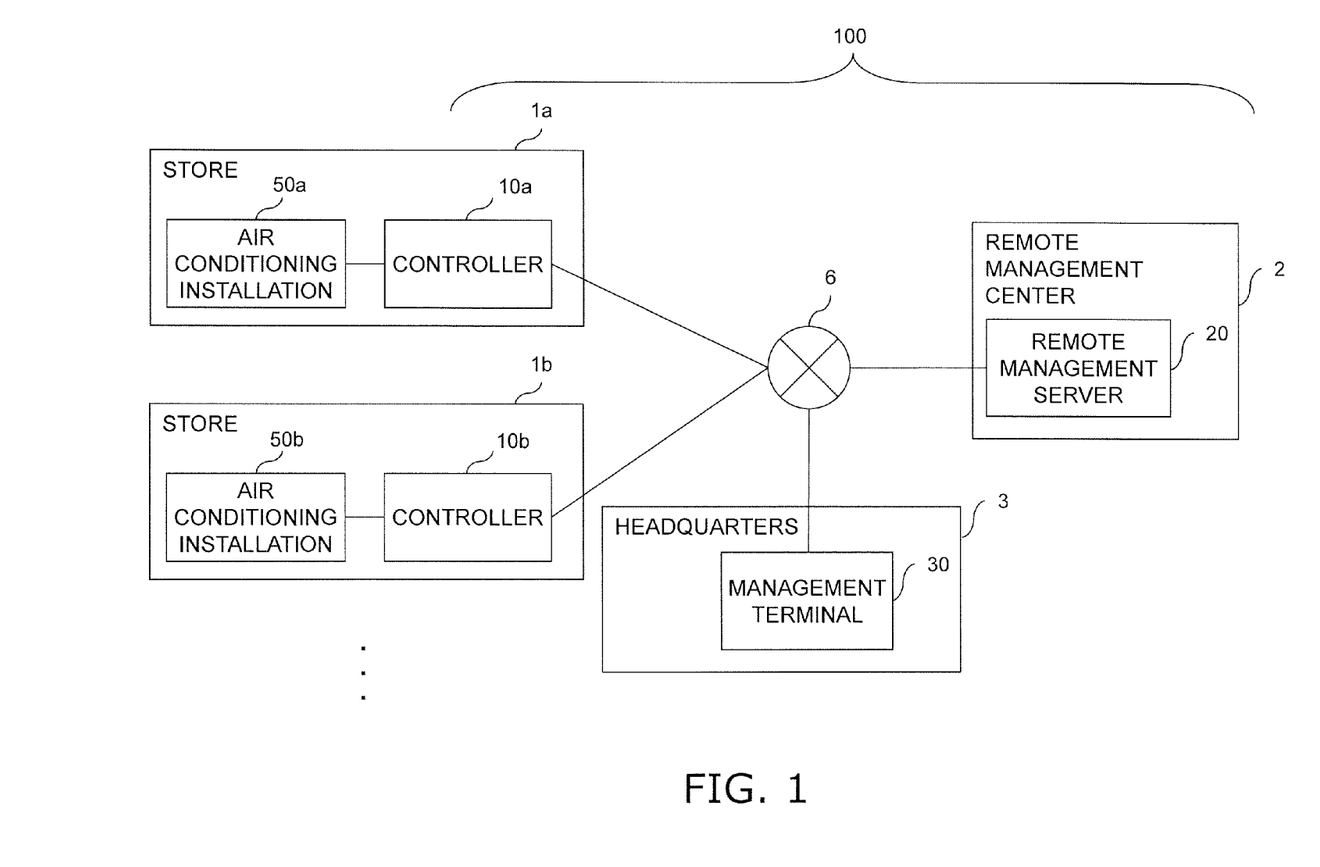
FIG. 1 is a diagram showing the configuration of a store management system pertaining to an embodiment of the present invention.

The store management system 100 shown in FIG. 1 is a system for supporting the managing, in headquarters 3 of an organization that unifies numerous stores 1*a*, 1*b*, ... scattered nationwide, of energy-saving activities of the stores 1*a*, 1*b*, .... The energy-saving activities in the present embodiment target air conditioning installations 50*a*, 50*b*, ... that are installed inside the stores 1*a*, 1*b*, ....

The store management system 100 is mainly configured from controllers 10*a*, 10*b*, ... that are installed inside the stores 1*a*, 1*b*, ..., a remote management server 20 to which the controllers 10*a*, 10*b*, ... are connectable via the Internet 6, and a management terminal 30 that is connectable to the remote management server 20 via the Internet 6. The remote management server 20 is installed inside a remote management center 2 that is run by an organization that provides remote management services (including a service that supports energy-saving activities) that remotely manage the air conditioning installations 50*a*, 50*b*, .... The management terminal 30 is installed inside the headquarters 3.

The store management system 100 detects, and quantifies as violating quantities, violating actions of the air conditioning installations 50*a*, 50*b*, ... running counter to energy-saving operating rules devised by the staff members of the headquarters 3. The violating quantities become original data of a report of the energy-saving activities created for the headquarters 3. The energy-saving operating rules are operating rules whose purpose is the achievement of energy saving in the stores 1*a*, 1*b*, ....

(2) Air Conditioning Installations

Figure 2:
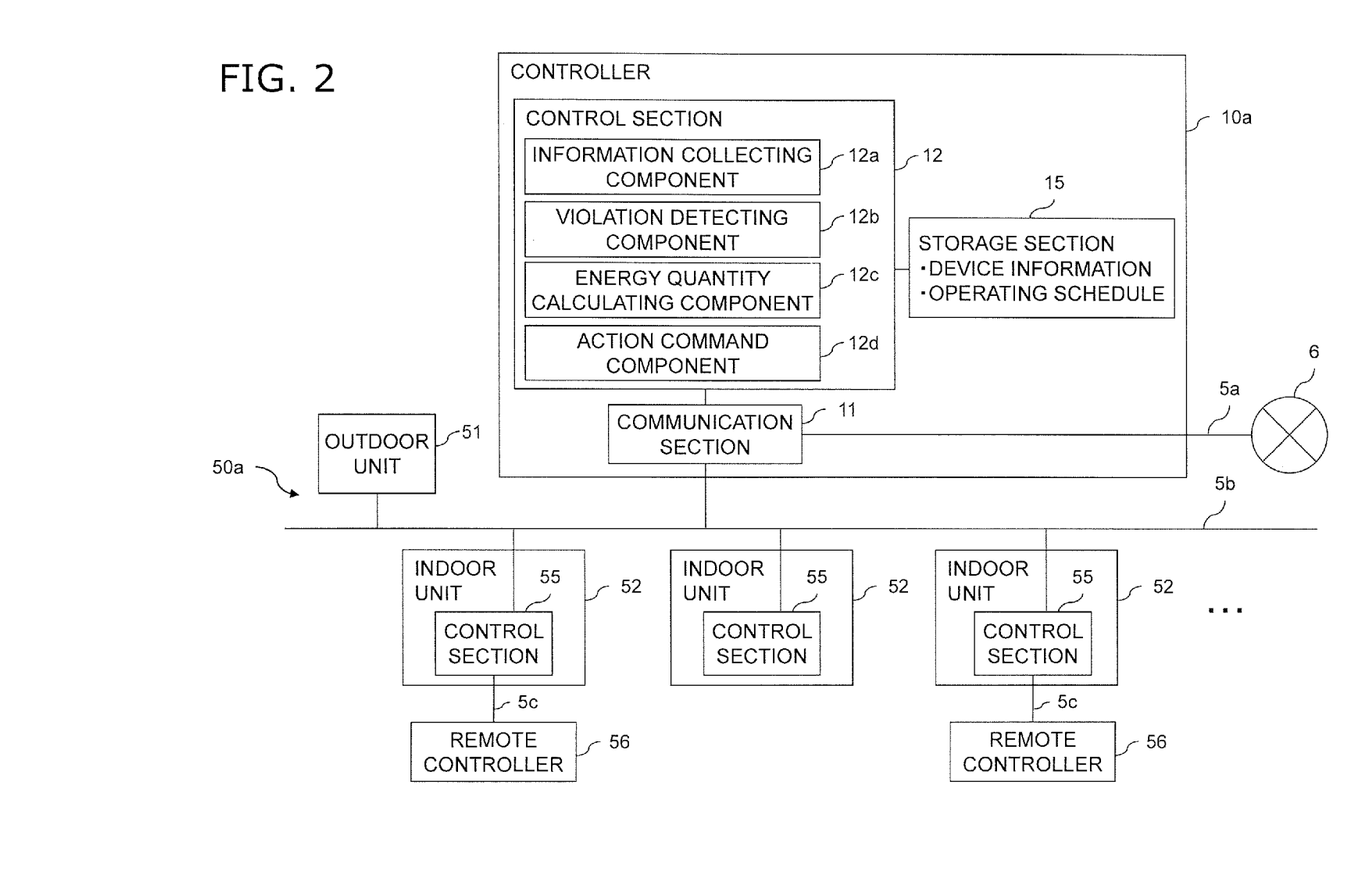
FIG. 2 is a diagram showing the configurations of an air conditioning installation and a controller inside a store.

The air conditioning installation 50*a* will be described below with reference to FIG. 2, but the same will also hold true for the other air conditioning installations 50*b*, ....

The air conditioning installation 50*a* has an outdoor unit 51 and one or multiple indoor units 52 that are connected to the outdoor unit 51 via refrigerant pipes, and overall the air conditioning installation 50*a* forms a refrigerant circuit that is configured from unillustrated compressors, heat exchangers, and so forth.

Each of the indoor units 52 has a control section 55. Each of the control sections 55 is connected to a control section (not shown) of the outdoor unit 51 and to the controller 10*a* via a communication line 5*b* dedicated to the air conditioning installation 50*a*.

Each of the control sections 55 cooperates with the control section (not shown) of the outdoor unit 51 to control the actions of the various parts included in the refrigerant circuit and condition the air inside a room in accordance with operation commands (e.g., a command that commands the corresponding indoor unit 52 to start up or stop; a command that commands the corresponding indoor unit 52 to change its set temperature, its set humidity, its set air volume, or its set air direction; a command that commands the corresponding indoor unit 52 to change its operating mode) from a remote controller 56 or the controller 10*a*. Specifically, each of the control sections 55 performs adjustment and so forth of the frequency of a compressor, the speed of a fan, and the opening degrees of various valves. The remote controllers 56 are for receiving the input of the operation commands with respect to the indoor units 52 from users inside the store 1*a* and are connected to the control sections 55 of the indoor units 52 via dedicated communication lines 5*c* in a one-to-one ratio or a one-to-many ratio.

The air conditioning installation 50*a* is designed so as to be capable of acting in capacity restriction levels of two stages. More specifically, the air conditioning installation 50*a* can switch between an unrestricted mode (a normal mode) in which its capacity is not restricted and a capacity-restricted mode in which it is controlled so as to act with a consumed energy of about 50% that of the case when it acts in the unrestricted mode. The process for switching between both modes is executed by the control section (not shown) of the outdoor unit 51.

Further, each of the control sections 55 transmits information (hereinafter called device information) relating to the corresponding indoor unit 52 to the controller 10*a* in response to a command from the controller 10*a*. The device information of the indoor units 52 includes information representing operating parameters of the indoor units 52 (the started/stopped running statuses, the set temperatures, the set humidities, the set air volumes, the set air directions, and the operating modes—such as cooling/heating/fan/dehumidification, etc.—of the indoor units 52), room temperatures, room humidities, status values of the various parts included in the indoor units 52 (e.g., including the speeds of the indoor fans and the temperatures and pressures of refrigerant in predetermined positions of the refrigerant circuit), and histories of operation of the remote controllers 56. Further, the control section (not shown) of the outdoor unit 51 transmits information (hereinafter called device information) relating to the outdoor unit 51 to the controller 10*a* in response to a command from the controller 10*a*. The device information of the outdoor unit 51 includes information representing the set value of the capacity restriction level, the outdoor air temperature, the outdoor air humidity, and status values of the various parts included in the outdoor unit 51 (e.g., including the frequency of the compressor, the speed of the outdoor fan, and the temperatures and pressures of refrigerant in predetermined positions of the refrigerant circuit). The room temperature, the room humidity, the outdoor air temperature, the outdoor air humidity, and the status values of the various parts included in the indoor units 52 and the outdoor unit 51 are sensed by unillustrated sensors or the like.

(3) Controller

The controller 10*a* will be described below with reference to FIG. 2, but the same will also hold true for the other controllers 10*b*, ....

The controller 10*a* is mainly configured from a communication section 11, a control section 12, and a storage section 15 and has the function of monitoring and controlling the air conditioning installation 50*a*. The controller 10*a* is an apparatus that does not have user interface devices such as an input device and a display device.

The communication section 11 is a network interface that enables the controller 10*a* to be connected to a LAN 5*a*—and by extension the Internet 6—and the communication line 5*b* dedicated to the air conditioning installation 50*a*.

The control section 12 is mainly configured from a CPU, a ROM, and a RAM and, by reading and executing programs stored in the storage section 15, acts as an information collecting component 12*a*, a violation detecting component 12*b*, an energy quantity calculating component 12*c*, and an action command component 12*d*.

The information collecting component 12*a* collects the device information of each of the indoor units 52 from the control sections 55 of those indoor units 52 at predetermined time intervals (in the present embodiment, every one minute). Moreover, the information collecting component 12*a* collects the device information of the outdoor unit 51 from the control section (not shown) of the outdoor unit 51 at predetermined time intervals (in the present embodiment, every one minute). The device information that the information collecting component 12*a* has collected is accumulated in a predetermined storage region reserved inside the storage section 15. This device information is transmitted from the controller 10a to the remote management server 20 via the Internet 6 at times of periodic communication at predetermined time intervals (in the present embodiment, every 30 minutes) between the controller 10a and the remote management server 20 in order to be utilized for various remote management services in the remote management server 20. Communication between the controller 10a and the remote management server 20 is realized as a result of the controller 10a acting as a web client and the remote management server 20 acting as a web server.

Further, the action command component 12d transmits appropriate operation commands to the appropriate indoor units 52 in accordance with an operating schedule stored in the storage section 15. For example, in a case where an operating schedule is set up so that a specific indoor unit 52 is to be operated in a cooling mode at a set temperature of 27° C. and a low air volume every day from 9:00 am to 6:00 pm, the action command component 12d transmits a command that sets the set temperature to 27° C., sets the set air volume to low, and sets the operating mode to the cooling mode to that indoor unit 52 every day at 9:00 am together with a startup command and transmits a stop command to that indoor unit 52 every day at 6:00 pm. The operating schedule can be made different for each of the indoor units 52. On the indoor units 52, the most recent operation commands that the indoor units 52 have received are executed preferentially regardless of whether the operation commands are from the controller 10a or from the remote controllers 56.

The actions of the violation detecting component 12b and the energy quantity calculating component 12c will be described later.

(4) Remote Management Server

Figure 3:
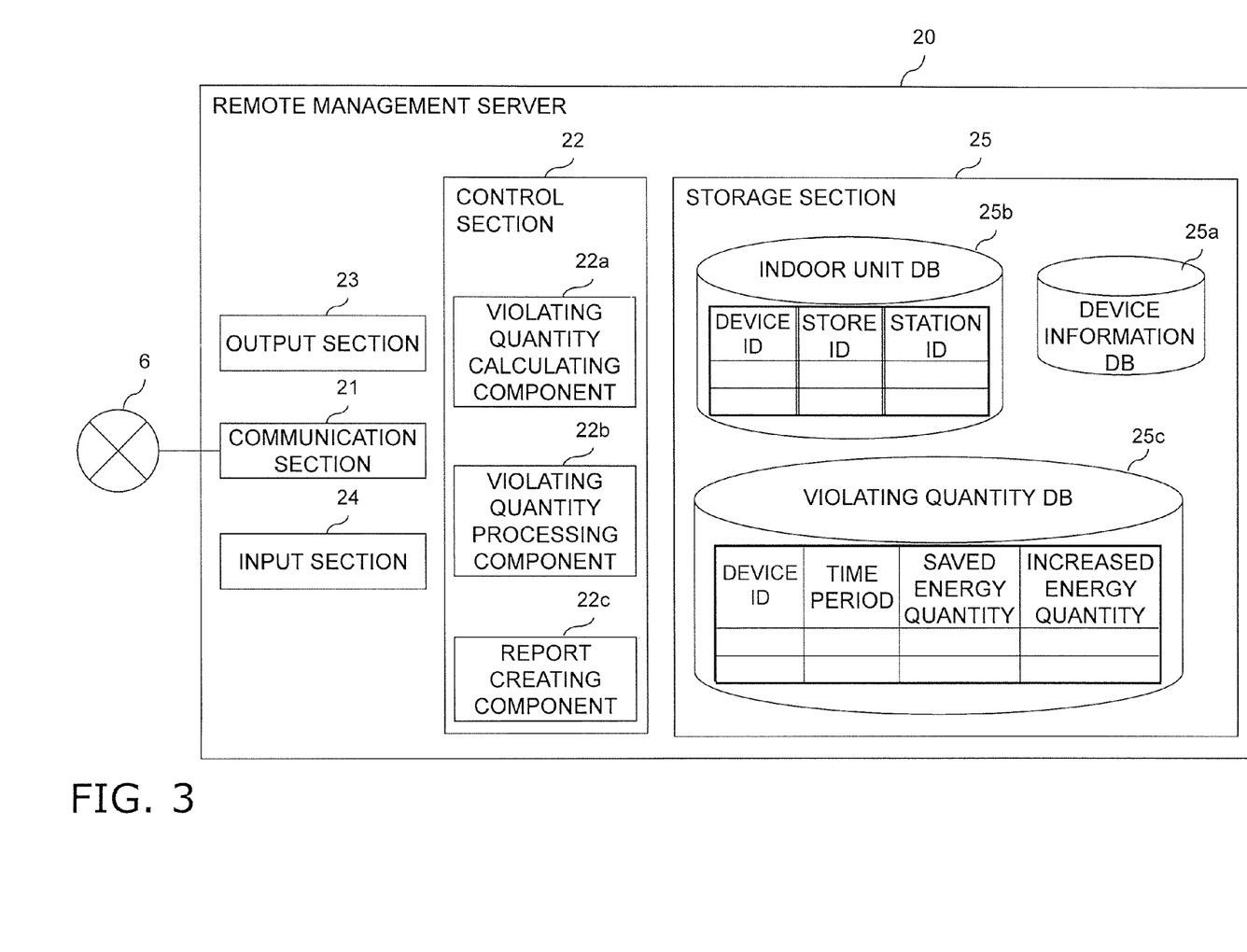
FIG. 3 is a diagram showing the configuration of a remote management server inside a remote management center.

As shown in FIG. 3, the remote management server 20 is a server computer mainly configured from a communication section 21, a control section 22, an output section 23, an input section 24, and a storage section 25 and has the function of monitoring and controlling the air conditioning installations 50a, 50b, . . . via the controllers 10a, 10b, . . . . The remote management server 20 has a web server function and can provide management screens of the stores 1a, 1b, . . . (including screens displaying the report of the energy-saving activities in the stores 1a, 1b, . . . ) to the management terminal 30 which has a web client function.

The communication section 21 is a network interface that enables the remote management server 20 to be connected to the Internet 6.

The control section 22 is mainly configured from a CPU, a ROM, and a RAM and, by reading and executing programs stored in the storage section 25, acts as a violating quantity calculating component 22a, a violating quantity processing component 22b, and a report creating component 22c. The actions of each of the components 22a to 22c will be described later.

The output section 23 is mainly configured from a display and a speaker, and the input section 24 is mainly configured from a mouse and a keyboard.

The storage section 25 is mainly configured from a hard disk and retains a device information database 25a, an indoor unit database 25b, and a violating quantity database 25c. In the device information database 25a, the device information of the air conditioning installations 50a, 50b, . . . sent from the controllers 10a, 10b, . . . is accumulated in an appropriate format. The device information inside the device information database 25a is utilized not only for the service of creating the report of the energy-saving activities in the stores 1a, 1b, . . . but also for the various remote management services that the remote management server 20 provides, such as an abnormality sensing service. The details of the indoor unit database 25b and the violating quantity database 25c will be described later.

(5) Management Terminal

Figure 4:
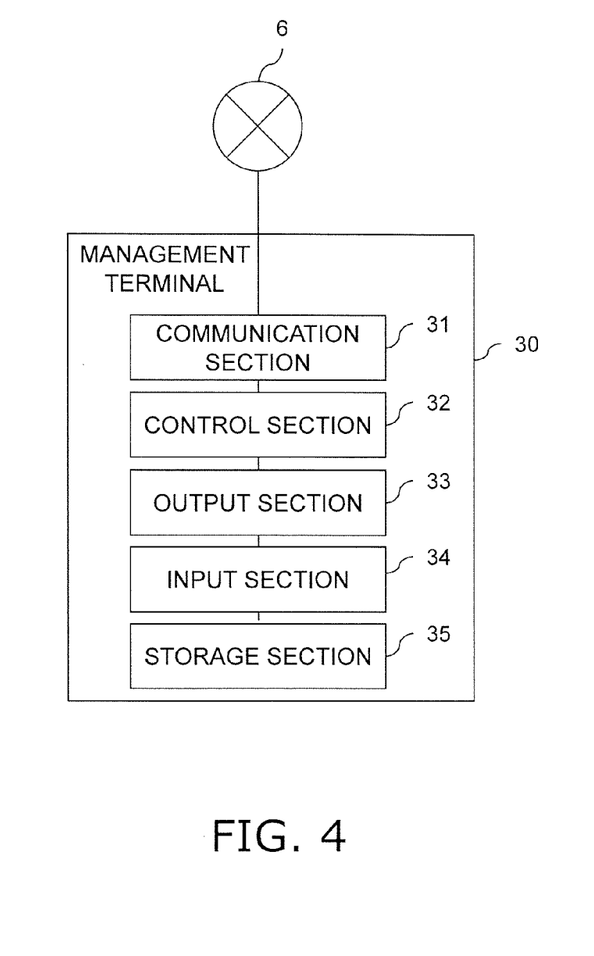
FIG. 4 is a diagram showing the configuration of a management terminal inside headquarters.

As shown in FIG. 4, the management terminal 30 is mainly configured from a communication section 31, a control section 32, an output section 33, an input section 34, and a storage section 35 and is a general-purpose personal computer that the staff members of the headquarters 3 use for daily tasks. A web browser having a web client function is installed in the management terminal 30. The staff members of the headquarters 3 can perform management of the stores 1a, 1b, . . . by acquiring the management screens of the stores 1a, 1b, . . . on the web browser from the remote management server 20 which is a web server.

The communication section 31 is a network interface that can connect the management terminal 30 to the Internet 6.

The control section 32 is mainly configured from a CPU, a ROM, and a RAM. The output section 33 is mainly configured from a display and a speaker, and the input section 34 is mainly configured from a mouse and a keyboard.

The storage section 35 is mainly configured from a hard disk.

(6) Flow of Processes Until Report is Delivered

Figure 5:
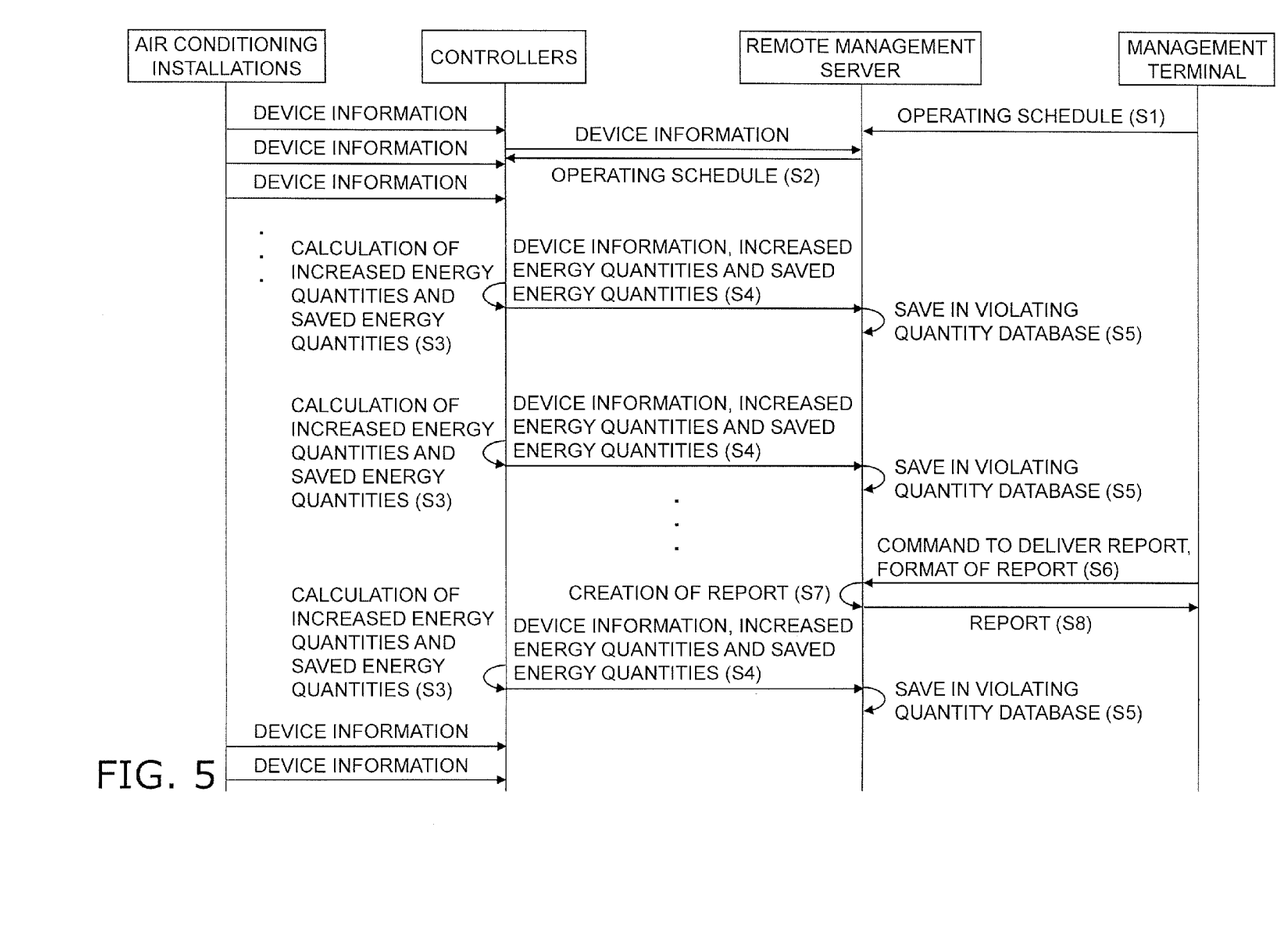
FIG. 5 is a diagram showing a flow of processes until a report is delivered.

A flow of processes until the report of the energy-saving activities in the stores 1a, 1b, . . . is delivered to the management terminal 30 of the headquarters 3 will be described below with reference to FIG. 5. FIG. 5 shows the temporal relationship of processes executed by four elements (the air conditioning installations 50a, 50b, . . . ; the controllers 10a, 10b, . . . ; the remote management server 20; and the management terminal 30) involved in the creation of the report and the flow of data transferred between those elements. In FIG. 5, the flow of time is defined from above to below.

The staff members of the headquarters 3 upload the energy-saving operating rules to be applied to the stores 1a, 1b, . . . to the remote management server 20 via the web browser of the management terminal 30 in the format of an operating schedule for the air conditioning installations 50a, 50b, . . . (step S1). The operating schedule can be made different for each of the air conditioning installations 50a, 50b, . . . .

The operating schedule for the air conditioning installations 50a, 50b, . . . that has been uploaded to the remote management server 20 is downloaded to the controllers 10a, 10b, at the times of the periodic communication between the controllers 10a, 10b, . . . and the remote management server 20 (step S2).

Incidentally, as described above, the controllers 10a, 10b, . . . collect the device information of the air conditioning installations 50a, 50b, . . . every one minute. The violation detecting components 12b of the controllers 10a, 10b, . . . judge the current action state of the air conditioning installations 50a, 50b, . . . on the basis of the device information (particularly the operating parameters of the indoor units 52) collected every one minute and detect violating actions of the air conditioning installations 50a, 50b, . . . running counter to the operating schedule. The violating actions are actions in general that differ from the actions prescribed in the operating schedule, such as, for example, a case where the set temperature is set higher or lower than the one in the operating schedule, a case where an air conditioning installation is running even though it should be stopped according to the operating schedule, and conversely a case where an air conditioning installation is stopped even though it should be running according to the operating schedule. The energy quantity calculating components 12c of the controllers 10a, 10b, . . . calculate, on the basis of the result of that detection, increased energy quantities and saved energy quantities at the times of the periodic communication with the remote management server 20 at the 30-minute intervals (step S3).

When violating actions are detected by the violation detecting components 12b, the action command components 12d of the controllers 10a, 10b, . . . transmit to the control sections 55 of the indoor units 52 pertaining to those violating actions appropriate operation commands commanding the indoor units 52 to operate as per the operating schedule after a predetermined amount of time (in the present embodiment, after 30 minutes). That is, the air conditioning installations 50a, 50b, . . . are configured such that, although a violating action running counter to the operating schedule is executed if there is an operation command from the remote controllers 56, they are corrected to an action as per the operating schedule when the predetermined amount of time elapses thereafter.

Incidentally, the increased energy quantities are quantities in which, of the violating actions of the air conditioning installations 50a, 50b, . . . running counter to the operating schedule during the 30 minutes immediately prior, violating actions contributing to increased energy over the operating schedule are quantified in line with a predetermined rule. The saved energy quantities are quantities in which, of the violating actions of the air conditioning installations 50a, 50b, . . . running counter to the operating schedule during the 30 minutes immediately prior, violating actions contributing to saved energy over the operating schedule are quantified in line with a predetermined rule. Examples of the rule include rules by which the violating action is calculated as a violation duration (the amount of time in which the violating action had been performed), or as a violation duration that has been converted to a basic unit, or as a violating energy quantity (an energy quantity that has increased over or decreased below a predetermined energy quantity because of the violating action or a $CO_2$ quantity that has increased over or decreased below a predetermined $CO_2$ quantity because of a violating action), or as a violating energy quantity that has been converted to a basic unit, or as the number of times the remote controllers 56 have been operated in violation. The energy quantities can be calculated, for example, by subtracting the set temperature resulting from the operating schedule from the actual set temperature and multiplying that difference by the violation duration. In step S3, the increased energy quantities and the saved energy quantities are calculated in indoor unit 52 units. That is, the increased energy quantities and the saved energy quantities calculated in step S3 become indicators expressing the extent of the violations during the 30 minutes from when step S3 is executed the previous time to until step S3 is executed this time in regard to each of the indoor units 52.

Thereafter, the controllers 10a, 10b, . . . upload to the remote management server 20 data of the increased energy quantities and the saved energy quantities calculated in step S3 together with the device information during the 30 minutes immediately prior at the times of the periodic communication with the remote management server 20 (step S4).

The remote management server 20 saves inside the violating quantity database 25c the data of the increased energy quantities and the saved energy quantities sent from the controllers 10a, 10b, . . . (step S5). The violating quantity database 25c is a tabular database such as shown in FIG. 3 and retains as single records data representing the increased energy quantities and the saved energy quantities per each of the indoor units 52 and per time period (the time span is 30 minutes and is defined, for example, like "From 10:00 am on Jan. 15, 2009 to 10:30 am on the same day").

After a quantity of data of the increased energy quantities and the saved energy quantities that is sufficient for the creation of the report has been accumulated inside the violating quantity database 25c as a result of step S3 to step S5 being repeated numerous times, the staff members of the headquarters 3 can request the remote management server 20 to deliver the report at an arbitrary timing (step S6). The command to deliver the report is uploaded to the remote management server 20 via the web browser of the management terminal 30 by the staff members of the headquarters 3 together with various parameters that decide the format of the report.

As soon as there is a request to deliver the report, the remote management server 20 executes step S7 in which it creates the report. The report created in step S7 is downloaded to the management terminal 30 from the communication section 21 of the remote management server 20 and is displayed on the web browser (step S8).

(7) Content of Report

The items appearing in the report of the energy-saving activities in the stores 1a, 1b, . . . will be described below with reference to FIG. 6 to FIG. 8.

7a) Violating Quantities

The violating quantities are arithmetic mean values of the increased energy quantities and the saved energy quantities in a specific target (the stores 1a, 1b, . . . overall, specific stores 1a, 1b, . . . , specific stations, or specific indoor units 52) in a specific time period (the preceding day, this week, last month, this year, etc.) and are calculated by the violating quantity calculating component 22a. The specific time period and the specific target are decided by the parameters inputted by the staff members of the headquarters 3 in step S6 in which the staff members request the creation of the report.

More specifically, the violating quantity calculating component 22a references the indoor unit database 25b and the violating quantity database 25c, calculates the arithmetic mean values of the total increased energy quantity and the total saved energy quantity in the specific time period of all of the indoor units 52 belonging to the specific target, and takes those arithmetic mean values as the violating quantities. The indoor unit database 25b is a tabular database such as shown in FIG. 3 and retains as single records data representing the affiliations (which stations in which of the stores 1a, 1b, . . . ) of each of the indoor units 52.

The report creating component 22c outputs on the report the violating quantities that have been calculated by the violating quantity calculating component 22a. Consequently, the staff members of the headquarters 3 can easily grasp the extent of violations in the specific target in the specific time period that they have designated.

The violating quantity calculating component 22a may also calculate the arithmetic mean values of the increased energy quantities and the saved energy quantities in single-day units, tally up only the arithmetic mean values of days on which the arithmetic mean values of single days become increased energy (that is, greater than 0), and take those arithmetic mean values as the violating quantities.

7b) Information Suggesting Content of Future Actions of Air Conditioning Installations for Offsetting Violating Quantities The violating quantity processing component 22b creates information suggesting the content of actions of the air conditioning installations 50a, 50b, . . . deemed necessary in the future in order to offset the violating quantities of the stores 1a, 1b, . . . overall (that is, in the air conditioning installations 50a, 50b, . . . overall) and in each of the stores 1a, 1b, . . . (that is, in each of the air conditioning installations 50a, 50b, . . . )

in a specific time period. The specific time period is decided by the parameters inputted by the staff members of the headquarters 3 in step S6 in which the staff members request the creation of the report.

More specifically, in a case where the violating quantity of the stores 1a, 1b, . . . overall in the specific time period is greater than 0 (that is, increased energy over the objective of the energy-saving operating rules), the violating quantity processing component 22b calculates the following three offset times needed for offsetting the energy quantity (overall violating energy quantity) corresponding to that violating quantity.

The first offset time is an amount of time in which the overall violating energy quantity can be offset in the stores 1a, 1b, . . . overall in a case where it has been judged that the set temperatures of all of the indoor units 52 of all of the air conditioning installations 50a, 50b, . . . are to be eased by $\Delta T°$ C. over the current operating schedule. The second offset time is an amount of time in which the overall violating energy quantity can be offset in the stores 1a, 1b, . . . overall in a case where it has been judged that all of the air conditioning installations 50a, 50b, . . . are to be stopped counter to the current operating schedule. The third offset time is an amount of time in which the overall violating energy quantity can be offset in the stores 1a, 1b, . . . overall in a case where it has been judged that all of the air conditioning installations 50a, 50b, . . . are to be operated in the capacity-restricted mode counter to the current operating schedule. The first offset time is graphed as shown in FIG. 6. In the graph in FIG. 6, the offset time is taken on the vertical axis and the set temperature easing quantity $\Delta T$ is taken on the horizontal axis.

Figure 6:
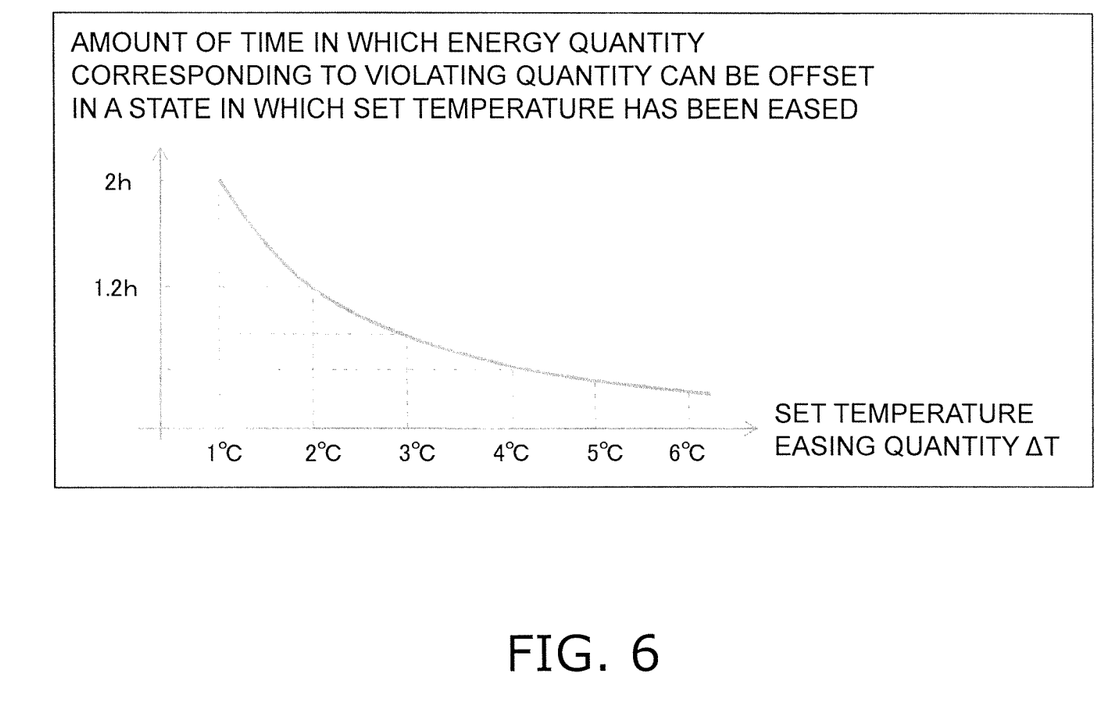
FIG. 6 is a diagram of a graph showing the relationship between set temperature easing quantity and offset time.

Moreover, the violating quantity processing component 22b targets each of the stores 1a, 1b, . . . and executes the same processes as the process for calculating the above-described three offset times targeting the stores 1a, 1b, . . . overall and the process for creating the graph in FIG. 6.

That is, the violating quantity processing component 22b calculates, with respect to each of the stores 1a, 1b, . . . in which the violating quantity in the specific time period is greater than 0 (that is, increased energy over the objective of the energy-saving operating rules), the following three offset times needed for offsetting the energy quantities (individual violating energy quantities) corresponding to those violating quantities.

The first offset time is an amount of time in which the individual violating energy quantities can be offset in those stores in a case where it has been judged that the set temperatures of all of the indoor units 52 of all of the air conditioning installations inside those stores are to be eased by $\Delta T°$ C. over the current operating schedule. The second offset time is an amount of time in which the individual violating energy quantities can be offset in those stores in a case where it has been judged that all of the air conditioning installations inside those stores are to be stopped counter to the current operating schedule. The third offset time is an amount of time in which the individual violating energy quantities can be offset in those stores in a case where it has been judged that all of the air conditioning installations inside those stores are to be operated in the capacity-restricted mode counter to the current operating schedule. The first offset time is graphed like in FIG. 6.

Figure 7:
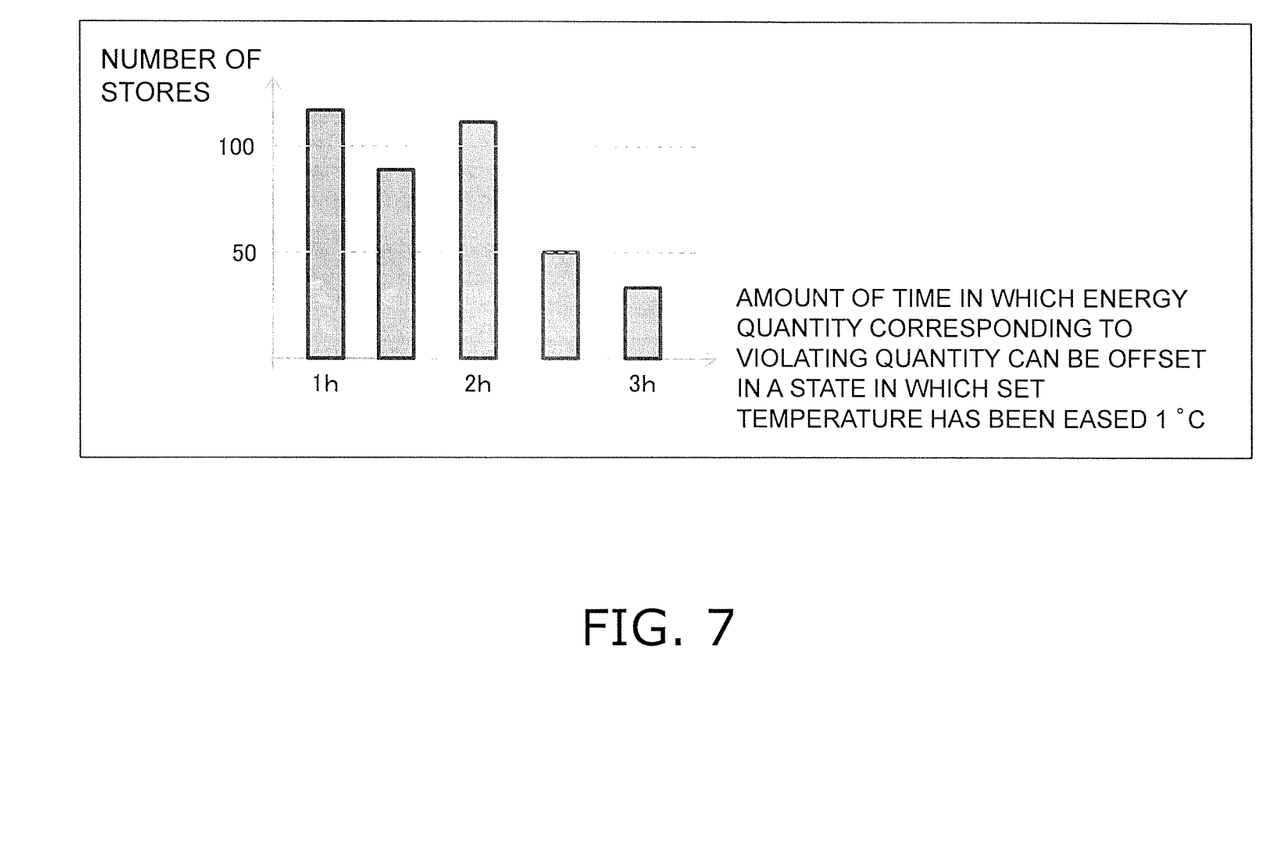
FIG. 7 is a diagram of a graph showing the breakdown of the number of stores per offset time.

Further, the violating quantity processing component 22b creates the graph shown in FIG. 7 in a case where the violating quantity of the stores 1a, 1b, . . . overall in the specific time period is greater than 0 (that is, increased energy over the objective of the energy-saving operating rules). Whereas in the graph in FIG. 6 the set temperature easing quantity $\Delta T$ is parameterized, in the graph in FIG. 7 the set temperature easing quantity $\Delta T$ is fixed (in the example in FIG. 7, $\Delta T=1°$ C.), the offset time is taken on the horizontal axis, and the number of stores is taken on the vertical axis. The graph in FIG. 7 shows the breakdown of the number of stores per offset time deemed necessary in order to offset the overall violating energy quantity in a case where it has been judged that the set temperatures of all of the indoor units 52 of all of the air conditioning installations 50a, 50b, . . . are to be eased by $\Delta T°$ C. over the current operating schedule. When the number of stores per offset time in FIG. 7 (in the example in FIG. 7, one hour, one and a half hours, two hours, two and a half hours, and three hours) is totaled, it equals the total number of stores.

In calculating the above offset times, the device information database 25a is referenced. Calculating the offset times means, in other words, predicting the amounts of time needed for cutting down the same energy quantity as the overall violating energy quantity or the individual violating energy quantities in a case where it has been judged that the air conditioning installations 50a, 50b, . . . are to be caused to perform a specific action that saves energy over the current operating schedule. Consequently, the violating quantity processing component 22b judges, on the basis of the past operating results of the air conditioning installations 50a, 50b, . . . accumulated in the device information database 25a, the relationship between specific actions of the air conditioning installations 50a, 50b, . . . and their energy consumption quantities and utilizes the relationship to predict the offset times.

The report creating component 22c outputs on the report the above-described information that has been created by the violating quantity processing component 22b. Consequently, it becomes easy for the staff members of the headquarters 3 to make decisions about future actions needed in order to offset the violating quantities, specifically devise future operating policies for the air conditioning installations 50a, 50b, . . . , and perform reviews of the operating schedule.

Figure 8:
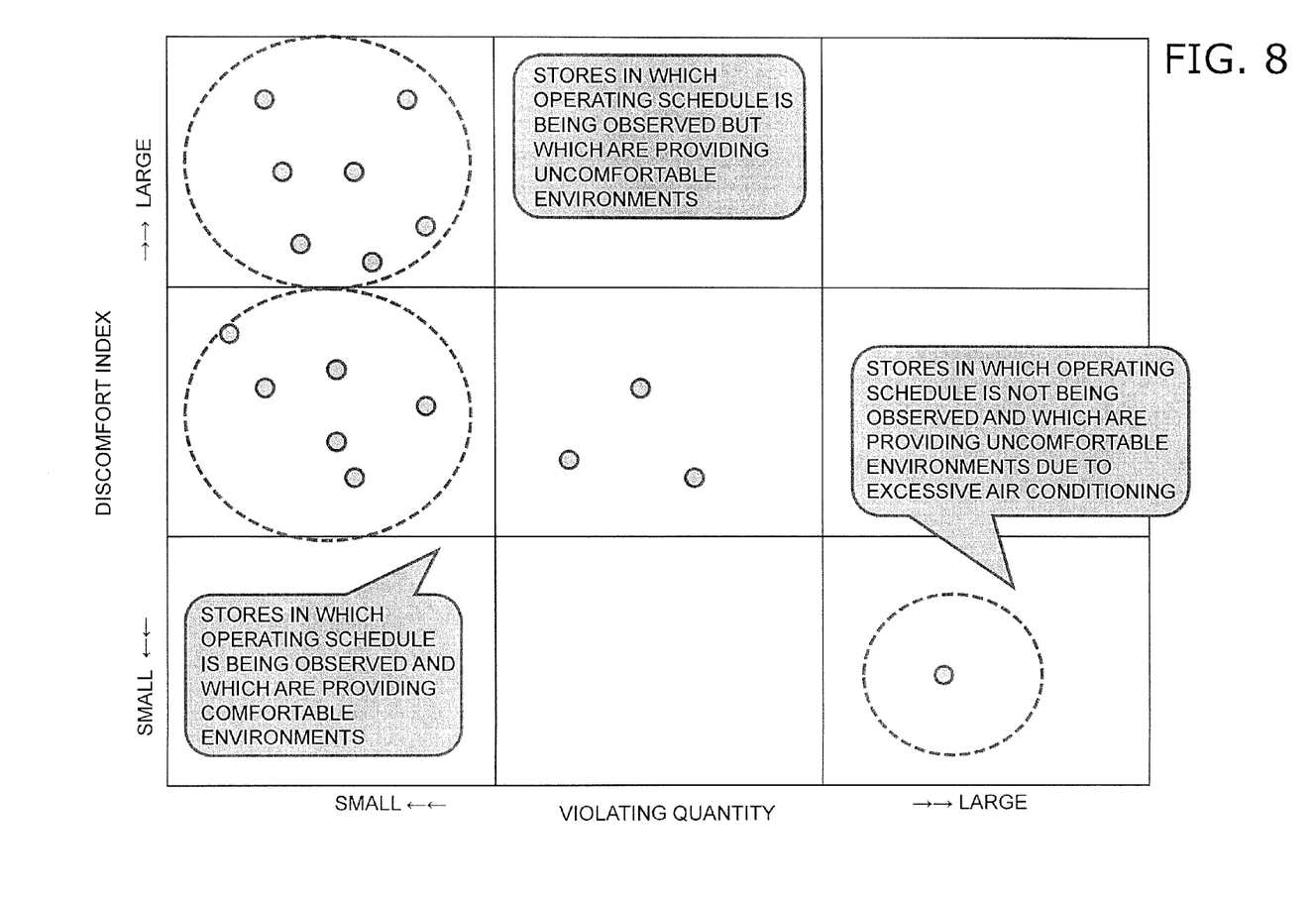
FIG. 8 is a distribution chart of stores by violating quantity and by discomfort index.

7c) Distribution Chart Showing Relationship Between Violating Quantities and Comfort Levels The violating quantity processing component 22b creates the distribution chart shown in FIG. 8. The distribution chart shown in FIG. 8 is a distribution chart showing the relationship between discomfort indices and violating quantities in each of the stores 1a, 1b, . . . in a specific time period. The specific time period is decided by the parameters inputted by the staff members of the headquarters 3 in step S6 in which the staff members request the creation of the report.

In the distribution chart in FIG. 8, the discomfort indices are taken on the vertical axis and the violating quantities are taken on the horizontal axis. The discomfort indices are obtained by indexing the comfort levels of the environments inside the stores 1a, 1b, . . . provided by the air conditioning installations 50a, 50b, . . . and are, for example, calculated with reference to the device information database 25a as divergent temperatures between the set temperatures prescribed in the operating schedule and the actual room temperatures, or the number of times the remote controllers 56 are operated in relation to changing the set temperatures, or values or the like reflecting these. Each of the points on the distribution chart in FIG. 8 corresponds to one of the stores 1a, 1b, . . . , and points corresponding to all of the stores 1a, 1b, . . . are placed on the distribution chart in FIG. 8.

The region near the upper left on the distribution chart in FIG. 8 is a region in which comfort is compromised and in which the violating quantity is small—in other words, a region in which the potential for stores in which the operating schedule is being observed but which are providing uncomfortable environments to exist is high. Consequently, a comment to that effect is outputted near the upper left. Further, the region near the center left on the distribution chart in FIG. 8 is a region in which comfort is being moderately maintained and in which the violating quantity is small—in other words, a region in which the potential for stores in which the operating schedule is being observed and which are providing comfortable environments to exist is high. Consequently, a comment to that effect is outputted near the center left. Further, the region near the lower right on the distribution chart in FIG. 8 is a region in which comfort is excessively high and in which the violating quantity is large—in other words, a region in which the potential for stores in which the operating schedule is not being observed and which are providing uncomfortable environments due to excessive air conditioning to exist is high. Consequently, a comment to that effect is outputted near the lower right.

The report creating component 22c outputs on the report the above-described distribution chart created by the violating quantity processing component 22b. Consequently, it becomes easy for the staff members of the headquarters 3 to evaluate whether or not the operating schedule is an appropriate one meeting the needs of the locales (that is, whether or not the people inside the stores 1a, 1b, . . . are feeling uncomfortable) and perform a review of the operating schedule.

<Characteristics>

(1)

The air conditioning installations 50a, 50b, . . . in the above-described embodiment are in principle controlled in accordance with the operating schedule by the controllers 10a, 10b, . . . but are configured such that violating actions stemming from operation of the remote controllers 56 or the like are allowed. These violating actions are detected by the controllers 10a, 10b, . . . and are thereafter quantified as violating quantities and outputted on the report for the headquarters 3. Consequently, the manager of the headquarters 3 can accurately grasp the impact that the violating actions of the air conditioning installations 50a, 50b, . . . running counter to the operating schedule have on the energy-saving activities embodied in the energy-saving operating rules.

(2)

In the above-described embodiment, the violating quantities that quantitatively express the violating actions of the air conditioning installations 50a, 50b, . . . running counter to the operating schedule are processed by the violating quantity processing component 22b as information suggesting the content of future actions of the air conditioning installations 50a, 50b, . . . for offsetting those violating quantities and as information representing the relationship between those violating quantities and the discomfort indices inside the stores 1a, 1b, . . . and are thereafter outputted on the report for the headquarters 3. Consequently, the manager of the headquarters 3 can accurately grasp the impact that the violating actions have on the energy-saving activities and can undertake a review of the operating schedule.

<Modifications>

(1)

In the above-described embodiment, the system 100 performs calculation and analysis of violating quantities targeting the air conditioning installations 50a, 50b, . . . , but the system 100 can also be applied to the calculation and analysis of a violating quantity targeting another installation device (e.g., an illumination device, a hot water supply device) or a combination of an air conditioning installation and another installation device like that.

(2)

In addition to or in place of the method mentioned above, the violating quantities may also be calculated on the basis of only the increased energy quantities or only the saved energy quantities of the increased energy quantities and the saved energy quantities.

According to this modification, it can be said that the increased energy quantities and the saved energy quantities calculated every 30 minutes and per each of the indoor units 52 by the energy quantity calculating components 12c of the controllers 10a, 10b, . . . are violating quantities in specific indoor units 52 in a specific 30 minutes.

(3)

In the above-described embodiment, store 1a, 1b, . . . units, station units, and indoor unit 52 units can be employed as the units in which the violating quantities are calculated. However, other units—such as, for example, geographical region units, building class units, form-of-business class (e.g., divided by hours of business, content of business, etc.) units, area level units, installation zone class (customer seating, kitchen, etc.) units, allocated operating schedule units—may also be employed. In order to calculate the violating quantities in other units, it is necessary to retain information representing the relationship between those units and the indoor units 52.

(4)

In the above-described embodiment, the controllers 10a, 10b, . . . calculate the increased energy quantities and the saved energy quantities in indoor unit 52 units, which are their minimum units, in order to make it possible to arbitrarily select the stores 1a, 1b, . . . overall, specific stores 1a, 1b, . . . , specific stations, or specific indoor units 52 as the target for which the violating quantities are calculated. However, in a case where the violating quantities are to be measured in only store 1a, 1b, . . . units, it also suffices for the controllers 10a, 10b, . . . to calculate the increased energy quantities and the saved energy quantities in store 1a, 1b, . . . units.

(5)

In the above-described embodiment, the report is created by the remote management server 20 at the time it is requested by the management terminal 30, that is, at an arbitrary timing when it is desired by the staff members of the headquarters 3, but the report may also be created periodically or may also be created at both timings. Further, the report is not limited to being provided via the Internet 6 and may also be provided by other means, such as by fax or by mail.

(6)

The increased energy quantities and the saved energy quantities may also be calculated in the remote management server 20 on the basis of the device information of the air conditioning installations 50a, 50b, . . . sent from the controllers 10a, 10b, . . . rather than being calculated in the controllers 10a, 10b, (7)

In the above-described embodiment, the operating schedule is downloaded to the controllers 10a, 10b, . . . from the remote management server 20, but the operating schedule may also be directly set in the controllers 10a, 10b, . . . inside the stores 1a, 1b, . . . .

(8)

In the above-described embodiment, the various items appearing in the report are calculated at the time when the report is created. However, some or all of these values may also be periodically calculated in the remote management server 20 and saved in a database inside the storage section 25. In this case, the amount of time until the report is actually created after there is a command to deliver the report (step S6) becomes shortened.

(9)

In the above-described embodiment, the operating schedule can be made different for each of the stores 1a, 1b, ... and even for each of the indoor units 52 inside the same stores 1a, 1b, ..., but it is also possible to apply the same operating schedule to the stores 1a, 1b, overall and to apply the same operating schedule to all of the indoor units 52 inside the same stores 1a, 1b, ....

(10)

The above-described embodiment may also be configured such that, when placing the points corresponding to each of the stores on the distribution chart in FIG. 8, only points corresponding to stores in which a specific condition (number of square meters, number of customers, sales, hours of business, environment (outdoor air temperature), geographical region, numbers of the indoor units 52 and the outdoor units 51, etc.) is met are placed on the same distribution chart.

In this modification, it is necessary for the specific condition per store to be stored inside the remote management server 20, for example, so that the specific condition can be judged. Further, it is preferable for the staff members of the headquarters 3 to be able to designate the specific condition in step S6 in which the staff members request the creation of the report.

According to this modification, it becomes easy to review the operating schedule applied to stores of the same condition.

(11)

In the above-described embodiment, the violating quantity calculating component 22a may also be configured to reference device configuration data of the air conditioning installations 50a, 50b, ... and calculate violating quantities to which the characteristics of the air conditioning installations 50a, 50b, ... have been added. The device configuration data are, for example, data relating to the geographical regions in which the air conditioning installations 50a, 50b, ... are installed, their models and dates of manufacture, and the places in which the indoor units 52 are installed (facing south, facing west, floor, near a window, etc.), and it is preferable for the device configuration data to be stored inside the remote management server 20.

(12)

In the above-described embodiment, the increased energy quantities and the saved energy quantities are calculated by detecting the violating actions of the air conditioning installations 50a, 50b, ... running counter to the operating schedule and converting those violating actions by a predetermined rule. However, a power meter 80 (see FIG. 9) may also be installed inside the stores 1a, 1b, ... to actually measure the energy consumption quantities of the air conditioning installations 50a, 50b, ..., so that the increased energy quantities and the saved energy quantities are determined by the differences between those energy consumption quantities and predetermined threshold values. Alternatively, the actual measurement values resulting from the power meters 80 may also be taken into consideration in the predetermined rule for converting the violating actions into the increased energy quantities and the saved energy quantities.

Figure 9:
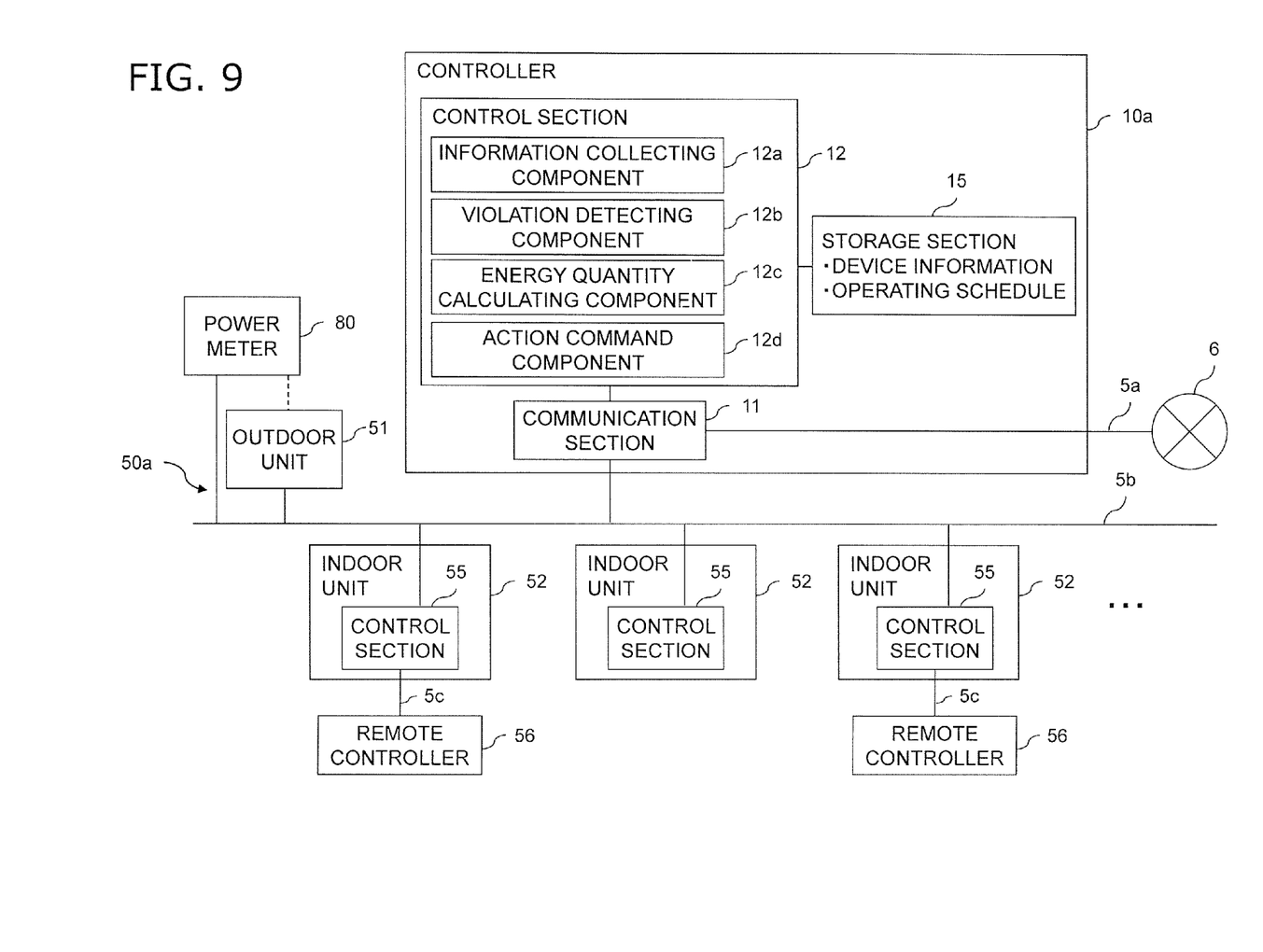
FIG. 9 is a diagram showing the configurations of an air conditioning installation and a controller inside a store pertaining to modification (12).

In this modification, it is preferable for the information collecting components 12a to collect the actual measurement values of the energy consumption quantities of the air conditioning installations 50a, 50b, ... from the power meters 80 at an appropriate timing (e.g., the point in time when a violating action is detected, the point in time when the operation command that corrects the violating action 30 minutes later is transmitted) as needed.

INDUSTRIAL APPLICABILITY

The present invention has the effect that the impact that a violating action of an installation device running counter to operating rules has on the management objective of the installation device embodied in the operating rules can be accurately grasped, and is useful as a device management system that manages an installation device.

What is claimed is:

1. A device management system configured to manage an installation device including an air conditioner, the device management system comprising:
    a storage section configured to store operating rules of the installation device, the operating rules including an operating schedule for the installation device;
    a detecting component configured to detect a violating action of the installation device running counter to the operating rules, the violating action including an action that contributes to increased energy with respect to energy in the operating rules, and an action in which an actual set temperature is set higher or lower than a set temperature in the operating rules;
    a calculating component configured to calculate a violating quantity that quantitatively expresses the violating action in a specific time period by subtracting the set temperature in the operating rules from the actual temperature and multiplying a difference between the set temperature and the actual set temperature by an amount of time in which the violating action is performed; and
    an action command component configured to transmit a control command complying with the operating rules to the installation device.

2. The device management system according to claim 1, wherein
    the device management system is configured to manage an air conditioner as the installation device.

3. The device management system according to claim 1, wherein
    at least one of a startup action and a stop action outside a timing prescribed in the operating rules is included in the violating action.

4. The device management system according to claim 1, further comprising
    a violating quantity output component configured to output the violating quantity.

5. The device management system according to claim 1, further comprising
    a processing component configured to create processing information in which the violating quantity has been processed; and
    a processing information output component configured to output the processing information.

6. The device management system according to claim 1, further comprising
    a measuring component configured to measure an actual energy consumption quantity of the installation device, the calculating component being further configured to reference the energy consumption quantity and to calculate the violating quantity.

7. The device management system according to claim 5, wherein
    an action that contributes to saved energy over the operating rules is included in the violating action.

8. The device management system according to claim 5, further comprising
a collecting component configured to collect device information relating to the installation device,
the processing component being further configured
to reference the violating quantity and the device information, and
to create, as the processing information, information suggesting a future action of the installation device in order to offset the violating quantity.

9. A device management system configured to unify and manage a plurality of management points each management point including one or a plurality of installation devices including air conditioners, the device management system comprising:
a plurality of storage sections configured to store operating rules of the installation devices in relation to corresponding management points of the plurality of the management points, the operating rules including an operating schedule for each of the installation devices;
a plurality of detecting components configured to detect violating actions of the installation devices running counter to the operating rules in relation to corresponding management points of the plurality of management points, the violating actions including an action that contributes to increased energy with respect to energy in the operating rules, and an action in which an actual set temperature is set higher or lower than a set temperature in the operating rules;
a plurality of calculating components configured to calculate violating quantities that quantitatively express the violating actions in a specific time period in relation to corresponding management points of the plurality of management points by subtracting the set temperature in the operating rules from the actual temperature and multiplying a difference between the set temperature and the actual set temperature by an amount of time in which the violating action is performed; and
a plurality of action command components configured to transmit control commands complying with the operating rules to the installation device in relation to corresponding management points of the plurality of management points.

10. The device management system according to claim 9, further comprising
a plurality of collecting components configured to collect device information relating to the installation devices in relation to corresponding management points of the plurality of management points; and
a creating component configured
to reference the violating quantities and the device information relating to the plurality of management points, and
to create information representing a relationship between the violating quantities and comfort levels of environments that the installation devices provide.

11. The device management system according to claim 2, wherein
at least one of a startup action and a stop action outside a timing prescribed in the operating rules is included in the violating action.

12. The device management system according to claim 11, further comprising
a violating quantity output component configured to output the violating quantity.

13. The device management system according to claim 12, further comprising
a processing component configured to create processing information in which the violating quantity has been processed; and
a processing information output component configured to output the processing information.

14. The device management system according to claim 13, further comprising
a measuring component configured to measure an actual energy consumption quantity of the installation device,
the calculating component being further configured to reference the energy consumption quantity and to calculate the violating quantity.

15. The device management system according to claim 14, wherein
an action that contributes to saved energy over the operating rules is included in the violating action.

16. The device management system according to claim 13, further comprising
a collecting component configured to collect device information relating to the installation device,
the processing component being further configured
to reference the violating quantity and the device information, and
to create, as the processing information, information suggesting a future action of the installation device in order to offset the violating quantity.

17. A device management system configured to manage an installation device including an air conditioner, the device management system comprising:
a storage section configured to store operating rules of the installation device, the operating rules including an operating schedule for the installation device;
a detecting component configured to detect a violating action of the installation device running counter to the operating rules, the violating action including an action that contributes to increased energy with respect to energy in the operating rules, and an action in which an actual set temperature is set higher or lower than a set temperature in the operating rules;
a calculating component configured to calculate a violating quantity that quantitatively expresses the violating action in a specific time period based on at least one of an amount of time in which the violating action is performed, an energy quantity that has increased because of the violating action, and a $CO_2$ quantity that has increased because of the violating action; and
an action command component configured to transmit a control command complying with the operating rules to the installation device.

* * * * *